Patented Sept. 5, 1933

1,925,376

UNITED STATES PATENT OFFICE 1,925,376

FOOD PRODUCT AND PROCESS OF MAKING SAME

Daniel A. Farrell, Chicago, Ill., assignor to John F. Jelke Company, Chicago, Ill., a corporation of Illinois No Drawing. Application November 23, 1932
Serial No. 644,139

20 Claims. (Cl. 99—11)

My invention relates to a food product and to a process for its preparation. More particularly my invention relates to a chocolate-flavored product comprising an emulsion of a vegetable fat or oil or mixture thereof with an aqueous chocolate portion, the product being adapted for use as a spread for bread, crackers and the like, as a filler for cakes and pastries and as a shortening agent.

One of the difficulties encountered in making spreadable chocolate-flavored preparations having a fat as its base lies in securing a substantially permanent and homogeneous emulsion between the fat base and the aqueous phase containing the chocolate. Particularly if vegetable fats or oils be used as the fatty ingredients, hard spots of fat will often appear in the resulting product unless especial steps be taken to avoid them. This is due to the fact that such fat preparations lack uniformity and particularly to the fact that certain high melting ingredients of the fat remain in the form of small aggregates or particles. While such aggregates or particles are relatively unobjectionable in a white material, since they do not show up conspicuously therein, they produce very objectionable white spots in a colored product such as is produced by the use of chocolate as one of the ingredients. In particular, cocoanut oils and oils of similar characteristics are subject to this objection.

I have now discovered that edible vegetable fats, such as cocoanut oil or other fats and oils may be blended with an aqueous chocolate preparation so that the presence of white spots will not be conspicuous in the product and so that it will have a smooth and spreadable texture.

It is, therefore, an object of this invention to prepare a chocolate-flavored spread, cake filler, shortening agent, or the like, having an edible vegetable fat base.

It is a further object of this invention to prepare a chocolate-flavored product for use as a spread, cake filler, shortening agent, or the like, which has a smooth texture and which has good spreading qualities at ordinary room temperatures.

Other and further important objects of this invention will be evident from the following description and the accompanying claims.

I prefer to use in the edible vegetable fat base of my product a high melting oil such as cocoanut oil. While cocoanut or other equivalent oil makes up the larger proportion of my fat base, I find, in order to manufacture the desired product economically, it is necessary to use a small proportion of some higher melting fat or its equivalent, for which purpose hydrogenated cocoanut oil is very satisfactory. Hydrogenated peanut oil or hydrogenated cottonseed oil or other oil of similar characteristics may be substituted either wholly or in part for the hydrogenated cocoanut oil.

Aside from the above ingredients, a small proportion of a low melting point oil such as unhydrogenated cotton seed oil, soya bean, corn, sesame or sunflower oil may be added to advantage.

As an illustration of a preferred embodiment of my invention, I give the following formula for the edible vegetable fat base, which may be modified by adding more or less of the alternative ingredients mentioned above:

| | Pounds |
|---|---|
| Cocoanut oil | 1800 |
| Cocoanut oil (hydrogenated) | 500 |
| Cottonseed oil | 300 |

In preparing a mix of these ingredients, the hydrogenated and unhydrogenated cocoanut oils are preferably first mixed together by churning them at a temperature of approximately 90° F., at which temperature the oils are free-flowing, and the agitation continuing over a period of approximately three minutes.

The proportion of hydrogenated cocoanut oil used may vary considerably from the figure given above, keeping in mind the desired consistency and other characteristics of the final product.

After the cocoanut and hydrogenated cocoanut oils have been mixed as above, thirty gallons of water at a temperature of about 46° F. are placed in the churn with the fats and the whole mass is agitated for about five minutes. Then the 300 lbs. of cottonseed oil, which should be at a temperature of about 80° F., are mixed in. At this point the mass will be in a flowable state. The important feature during this step is to prevent the oils from graining. The temperatures above are selected with this in mind but are not critical.

The next step is to pour this flowable mass into cold water maintained at a temperature of about 34° F. to crystallize the fats. This is accomplished by flowing the fatty mass into a stream of cold water, whereupon the fatty mass is broken up and quickly chilled to produce small globules or granules of fat. The stream flows for such a distance that the fat and water will remain together for preferably less than two minutes. It will be understood that the vegetable fats may, however, be crystallized in any desired manner.

The fat mixture, after being crystallized, is mechanically removed from the water and dumped into a large mass of water at a temperature of 67° F. This latter temperature is important, and for best results should not be permitted to vary by more than 2° F. either way. The fat, being in a highly subdivided state before being charged into the water, is rapidly and uniformly brought to very nearly the temperature of the water and at that temperature coalesces again into a large unitary mass. The purpose of charging the fat base into water is to bring it quickly and uniformly to the desired temperature. This may be also accomplished by tempering in the air to the same temperature as specified but not so satisfactorily as by the use of water.

After leaving the water bath, the fat is placed in a continuous working device, preferably one having screw blades, and is worked until the water content is brought down to about 9%. When this point is reached, the mass is removed to a butter worker, comprising a revolving table and a wooden roll, and is worked on this device until the moisture content is reduced to somewhat below 9%, preferably to about 7%. The exact manner of working is not critical, neither is it necessary to use the specific types of machines mentioned above. Since the object of this working is to reduce the moisture content, it is evident that any device which will accomplish this object will be operative. However, the particular arrangement discussed above, or an equivalent thereof, has the virtue that all particles are properly worked so that the tendency for white particles to appear in the finished product is lessened.

After the moisture content has been reduced and the mass has been thoroughly worked to maintain all parts of the mass at the same temperature, so as to eliminate most, if not all, of the hard particles, the material is placed in a tempering room, where it is held at a temperature of about 64 to 68° F. for from twelve to eighteen hours.

It is desirable to work or mix the fatty material with the milk and aqueous chocolate syrup immediately after the moisture content has been reduced to the proper amount, but if this can not be done because of insufficient equipment, the fatty material must be kept under close temperature control in a tempering room.

After the tempering is finished, the material is mixed with milk, for example, about twenty gallons of milk for each 2600 pounds of fatty material.

Preferably, the milk should be slightly acid. This may be accomplished by adding a suitable amount of lactic acid culture and ripening the milk to about .85% acidity. At the time that the milk is added, a suitable amount, for example, about 3% by weight of an emulsifying agent should be added. These ingredients are then thoroughly worked together at room temperature.

About 1560 lbs. of a suitable chocolate syrup, also at ordinary room temperature, are then added and thoroughly worked into the mass, while the fats of the base are in a solidified state; that is, without the application of heat. At this time about ½% by weight of salt, based on the total weight of the mix, is added. After these ingredients have been worked together until the mass is smooth and of suitable texture, the mass is spread in thin layers to permit it to reach uniform temperatures in the shortest possible time, and is chilled to render it capable of being printed. The product may then be printed and packed for shipment and sale. If the product is to be packaged in glass or other similar containers, however, this chilling step is unnecessary.

The chocolate-bearing material used in my preparation should be in the form of an aqueous syrup. A syrup of the following formula is satisfactory, but I do not desire to have this construed as a limitation on my invention, for, obviously, many other types of aqueous chocolate syrups could be compounded which would be operative for my purpose:

| | Percent by weight |
|---|---|
| Sugar | 62 |
| Cocoa | 12 |
| Chocolate | 7 |
| Salt | 0.2 |
| Vanilla | 0.01 |
| Water | balance, or about 18% |

The emulsifying agent which I prefer to use in my composition is one commonly sold under the name of "Emargol." This is a complex fatty mixture consisting of approximately 50 to 55% of moisture and 45 to 50% by weight of fatty matter. The active emulsifying agent in the fatty matter is monostearyl glycerine sodium sulphoacetate, which is present in the mixture to the extent of approximately 15 to 20% by weight.

The structural formula of the monostearyl glycerine sodium sulphoacetate appears to be:

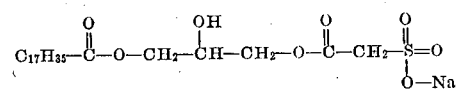

Some of the equivalents of the monostearyl glycerine sodium sulphoacetate are monomelissyl glycerine sodium sulphoacetate, monopalmityl sodium sulphoacetate and mono-oleyl sodium sulphoacetate. The stearic acid may be replaced by any higher fatty acid residue, such as a residue containing between 8 and 30 carbon atoms, and the substance will still function like monostearyl glycerine sodium sulphoacetate. However, as the molecular weight of the fatty acid diminishes, the emulsifying power also diminishes somewhat.

Of course, it will be understood that other edible emulsifying agents such as agar-agar, gum tragacanth, and other gums, may be used if desired, but not so satisfactorily.

The following formula gives the approximate percentages of the major ingredients in a typical composition of my invention:

| | Per cent |
|---|---|
| Fats | 57–58 |
| Sugar | 18–19.5 |
| Water | 15–16 |

This formula reveals another important departure of my invention from the prior compositions, namely, an unusually large proportion of fats in combination with a relatively high liquid phase content. I prefer to keep the fat content above 50%, since a lower proportion of fat causes a diminution of the valuable qualities of easy spreadability and uniform texture. Also, unless a fat content is present as a major constituent it would be impossible to print the product satisfactorily.

The product of this process is a substantially permanent and homogeneous emulsion of an edible vegetable fat and an aqueous chocolate-bearing syrup, which is of smooth uniform texture and of semi-solid consistency and spreadable like butter. The flavor of the chocolate predominates over that of the other ingredients, thus making a new product entirely different from any spread for bread, cake, pastries or the like previously known.

Reference is made to my co-pending application entitled "Food product and method of making same", Serial No. 644,140, filed of even date herewith.

I am aware that numerous details of the process may be varied through a wide range without departing from the principles of this invention, and I, therefore, do not purpose limiting the patent granted hereon otherwise than necessitated by the prior art.

I claim as my invention:

1. A food preparation of semi-solid consistency and spreadable at room temperatures, comprising a substantially permanent homogeneous emulsion of an aqueous chocolate-bearing material in an edible vegetable fat, and an emulsifying agent, the fat being present in the emulsion in a major proportion by weight.

2. A food preparation of semi-solid consistency and spreadable at room temperatures, comprising a substantially permanent homogeneous emulsion of an aqueous syrup of chocolate, cocoa and sugar in a mixture of edible vegetable fats, and an emulsifying agent, said fat mixture being present in the emulsion in a major proportion by weight.

3. A food preparation of semi-solid consistency and spreadable at room temperatures, comprising a substantially permanent homogeneous emulsion of an aqueous suspension of chocolate-bearing material in an edible vegetable fat and a glyceryl ester of a higher fatty acid and of sodium sulphoacetate.

4. A food preparation of semi-solid consistency and spreadable at room temperatures, comprising a substantially permanent homogeneous emulsion of an aqueous suspension of chocolate material in a mixture of fats and monostearyl glycerine sodium sulphoacetate as the active emulsifying agent.

5. A food preparation of semi-solid consistency and spreadable at room temperatures, comprising a substantially permanent homogeneous emulsion of an aqueous portion containing a chocolate-bearing material and sugar, an edible vegetable fat, and an emulsifying agent, the aqueous portion and the fat being initially mixed in the proportion of about 1 part of the aqueous portion to 2 parts of the fat by weight.

6. A food preparation of semi-solid consistency and spreadable at room temperatures, comprising a substantially permanent homogeneous emulsion of an aqueous portion containing a chocolate-bearing material and sugar, an edible vegetable fat including cocoanut oil, and an emulsifying agent.

7. A food preparation of semi-solid consistency and spreadable at room temperatures, comprising a substantially permanent homogeneous emulsion of an aqueous portion containing a chocolate-bearing material and sugar, a fatty base comprising cocoanut oil, hydrogenated cocoanut oil and cotton seed oil, and an emulsifying agent.

8. A food preparation of semi-solid consistency and spreadable at room temperatures, comprising a substantially permanent homogeneous emulsion of an aqueous portion containing a chocolate-bearing material and sugar, a fatty mixture of relatively low and relatively high melting point vegetable oils, and an emulsifying agent.

9. A food preparation of semi-solid consistency and spreadable at room temperatures, comprising a substantially permanent homogeneous emulsion of an aqueous portion containing a chocolate-bearing material and sugar, a fatty base comprising approximately 18 parts of cocoanut oil to 15 parts of hydrogenated cocoanut oil to 3 parts of cotton seed oil, and an emulsifying agent, the fatty base constituting a major proportion of said emulsion.

10. A food preparation of semi-solid consistency and spreadable at room temperatures, comprising a substantially permanent homogeneous emulsion of an aqueous portion containing a chocolate-bearing material and sugar, a fatty base of cocoanut oil, hydrogenated cocoanut oil and cotton seed oil, and monostearyl glycerine sodium sulphoacetate, the fatty base constituting a major proportion of said emulsion by weight.

11. The process of preparing a chocolate-flavored food composition, which comprises crystallizing an edible vegetable fat and emulsifying with said fat in the cold by means of an emulsifying agent, an aqueous portion containing a chocolate-bearing material to produce a substantially permanent homogenous emulsion of said aqueous portion and said fat, said emulsion being of semi-solid consistency and spreadable at room temperatures.

12. The process of preparing a chocolate-flavored food composition, which comprises emulsifying with a solidified edible vegetable fat, by means of an emulsifying agent, an aqueous syrup of a chocolate-bearing material, to produce a substantially permanent homogeneous emulsion of semi-solid consistency and spreadable at room temperatures.

13. The process of preparing a chocolate-flavored food composition, which comprises churning a mixture of edible vegetable fats in a flowable condition, crystallizing said fat mixture, and emulsifying with said fat mixture while in a solidified condition by means of an emulsifying agent, an aqueous chocolate-bearing syrup, to produce a substantially permanent homogenous emulsion of semi-solid consistency and spreadable at room temperatures.

14. The process of preparing a chocolate-flavored food composition, which comprises churning a mixture of edible vegetable fats in a flowable condition, crystallizing said fat mixture, and emulsfying with said fat mixture while in a solidified state by means of an emulsifying agent an aqueous syrup of chocolate-bearing material and sugar, the proportions of the fat mixture and aqueous syrup being approximately two parts of said fat mixture to one part by weight of soid aqueous syrup, to produce a substantially permanent homogeneous emulsion of semi-solid consistency and spreadable at room temperatures.

15. The process of preparing a chocolate-flavored food composition, which comprises emulsifying with an edible vegetable oil in a solid condition, an aqueous chocolate-bearing liquid by means of an emulsifying agent having as its active constituent a glyceryl ester of a higher fatty acid and of sodium sulphoacetate, to produce a substantially permanent homogeneous emulsion 16. The process of preparing a chocolate-flavored food composition, which comprises emulsifying an aqueous syrup containing a chocolate-bearing material and sugar with a mixture of edible vegetable fats by means of monostearyl glycerine sodium sulphoacetate, to produce a substantially permanent homogeneous emulsion of semi-solid consistency and spreadable at room temperatures.

17. The process of preparing a chocolate-flavored food composition, which comprises crystallizing a fatty mixture of edible vegetable oils including cocoanut oil, and emulsifying an aqueous chocolate-bearing syrup with said fatty mixture while in a solidified state by means of an emulsifying agent, to produce a substantially permanent homogeneous emulsion of semi-solid consistency and spreadable at room temperatures.

18. The process of preparing a chocolate-flavored food composition, which comprises mixing together cocoanut oil, hydrogenated cocoanut oil and cotton seed oil while in a flowable state, crystallizing said oil mixture, charging said oil mixture after crystallization into water at about 67° F., reducing the moisture content of said oil mixture and emulsifying an aqueous chocolate-bearing syrup with said oil mixture by means of an emulsifying agent, to produce a substantially permanent homogeneous emulsion of semi-solid consistency and spreadable at room temperatures.

19. The process of preparing a chocolate-flavored food composition, which comprises mixing together relatively high melting point edible vegetable fats and relatively low melting point edible vegetable oils while in a flowable condition, crystallizing said oil mixture, charging said oil mixture into water at about 67° F., working said oil mixture to reduce the water content thereof to below 9% and emulsifying an aqueous chocolate-bearing syrup with said oil mixture in the proportion of about two parts of said oil mixture to one part by weight of said syrup while said oil mixture is in a solidified condition by means of a glyceryl ester of a higher fatty acid and of sodium sulphoacetate, to produce a substantially permanent homogeneous emulsion of semi-solid consistency and spreadable at room temperatures.

20. The process of preparing a chocolate-flavored food composition, which comprises mixing together relatively high melting point edible vegetable fats and relatively low melting point edible vegetable oils while in a flowable condition, crystallizing said oil mixture, charging said oil mixture into water at about 67° F., working said oil mixture to reduce the water content thereof to below 9% and emulsifying an aqueous chocolate-bearing syrup with said oil mixture in the proportion of about two parts of said oil mixture to one part by weight of said syrup while said oil mixture is in a solidified condition by means of monostearyl glycerine sulphoacetate, to produce a substantially permanent homogeneous emulsion of semi-solid consistency and spreadable at room temperatures.

DANIEL A. FARRELL.